(12) United States Patent
Koops et al.

(10) Patent No.: US 9,550,920 B2
(45) Date of Patent: *Jan. 24, 2017

(54) ADHESIVE TAPE, PREFERABLY SELF-ADHESIVE TAPE, COMPRISING OF AT LEAST TWO LAYERS A AND B LAMINATED DIRECTLY ON ONE ANOTHER, WITH AT LEAST ONE OR BOTH LAYERS A OR B BEING AN ADHESIVE

(75) Inventors: Arne Koops, Neu-Lankau (DE); Hermann Neuhaus-Steinmetz, Ahrensburg (DE); Uwe Schümann, Pinneberg (DE); Thomas Schubert, Hamburg (DE); Olga Kirpicenok, Hamburg (DE); Kirstin Weiland, Hamburg (DE); Dennis Perlbach, Neu Wulmstorf (DE); Sarah Reich, Hamburg (DE)

(73) Assignee: tesa SE, Norderstedt (DE)

(*) Notice: Subject to any disclaimer, the term of this patent is extended or adjusted under 35 U.S.C. 154(b) by 235 days.

This patent is subject to a terminal disclaimer.

(21) Appl. No.: 14/114,582

(22) PCT Filed: May 4, 2012

(86) PCT No.: PCT/EP2012/058284
§ 371 (c)(1),
(2), (4) Date: Jan. 9, 2014

(87) PCT Pub. No.: WO2012/152712
PCT Pub. Date: Nov. 15, 2012

(65) Prior Publication Data
US 2014/0154944 A1    Jun. 5, 2014

(30) Foreign Application Priority Data
May 6, 2011  (DE) .................... 10 2011 075 470

(51) Int. Cl.
*C09J 7/02* (2006.01)
*C09J 7/00* (2006.01)
*B29C 59/08* (2006.01)
*B29C 59/10* (2006.01)
*B29C 59/14* (2006.01)

(52) U.S. Cl.
CPC .................. *C09J 7/0217* (2013.01); *C09J 7/00* (2013.01); *C09J 7/02* (2013.01); *B29C 59/08* (2013.01); *B29C 59/10* (2013.01); *B29C 59/14* (2013.01); *C09J 2201/606* (2013.01); *C09J 2400/226* (2013.01); *C09J 2400/228* (2013.01); *Y10T 428/28* (2015.01); *Y10T 428/2809* (2015.01); *Y10T 442/674* (2015.04)

(58) Field of Classification Search
CPC ........... Y10T 442/674; Y10T 428/2809; Y10T 428/28; C09J 7/00; C09J 7/02; C09J 7/0217; C09J 2400/228; C09J 2400/226; C09J 2201/606; G06F 9/4812; B29C 59/08; B29C 59/10; B29C 59/14
USPC ....... 428/40.1–42.3, 58, 343–355 N; 442/64, 442/149, 150, 394
See application file for complete search history.

(56) References Cited

U.S. PATENT DOCUMENTS

| | | | |
|---|---|---|---|
| 5,879,757 A | 3/1999 | Gutowski et al. | |
| 7,147,758 B2 | 12/2006 | Cocolios et al. | |
| 7,217,455 B2* | 5/2007 | Valdez | C09J 7/00 427/208.2 |
| 2008/0257379 A1 | 10/2008 | Buske et al. | |
| 2010/0055435 A1 | 3/2010 | Neubert et al. | |
| 2015/0159053 A1* | 6/2015 | Schumann | C08G 18/4829 428/317.3 |

FOREIGN PATENT DOCUMENTS

| | | |
|---|---|---|
| DE | 690 21 774 T2 | 4/1996 |
| DE | 44 38 533 A1 | 5/1996 |
| DE | 695 31 394 T2 | 6/2004 |
| DE | 103 47 025 A1 | 7/2005 |
| DE | 10 2006 057 800 A1 | 6/2008 |
| DE | 10 2007 011 235 A1 | 9/2008 |
| DE | 10 2007 063 021 A1 | 6/2009 |
| EP | 0 740 681 B1 | 11/1996 |
| EP | 1 262 532 B1 | 12/2002 |
| JP | 2009 086452 A | 4/2009 |

OTHER PUBLICATIONS

JP 2009-086452 machine translation; Apr. 23, 2009.*
Wagner et at., "The Barrier Discharge: Basic Properties and Applications to Surface Treatment", Vacuum, vol. 71, pp. 417-436, 2003.
Communication, "A Table of Fikentscher K Values versus Relative Viscosities for a Concentration of 1*0": Polymer 8, pp. 381-384, 1967.
International Search Report Dated Aug. 31, 2012, Mailed Sep. 11, 2012.
German Search Report Dated Apr. 18, 2012.

* cited by examiner

*Primary Examiner* — Arti Singh-Pandey
(74) *Attorney, Agent, or Firm* — Norris McLaughlin & Marcus PA (57) ABSTRACT

Adhesive tape having at least two layers A and B laminated directly on one another, with at least one or both layers A or B being an adhesive, and the interfaces of the layers A and B laminated on one another being subjected to a physical method, the physical method being selected from the group consisting of corona discharge, dielectric barrier discharge, flame pretreatment and plasma treatment, before the layers are laminated to one another, with the two methods differing from one another.

11 Claims, 3 Drawing Sheets

ADHESIVE TAPE, PREFERABLY SELF-ADHESIVE TAPE, COMPRISING OF AT LEAST TWO LAYERS A AND B LAMINATED DIRECTLY ON ONE ANOTHER, WITH AT LEAST ONE OR BOTH LAYERS A OR B BEING AN ADHESIVE

This is a 371 of PCT/EP2012/058284 filed 4 May 2012 (international filing date), and claiming priority of German Application 10 2011 075 470.9, filed May 6, 2011.

The invention pertains to an adhesive tape, preferably self-adhesive tape, comprising at least two layers A and B laminated directly to one another, at least one or both layers A or B being an adhesive.

BACKGROUND OF THE INVENTION

In the sector of industrial manufacture, the demand exists for simple pretreatment techniques in order to improve the adhesive bonding properties of the adherend.

Costly and inconvenient processes such as wet-chemical cleaning and priming of the adherend surface are typically used in order to obtain high-strength bonds with a self-adhesive tape.

More particularly the simple physical pretreatment techniques under atmospheric pressure (corona, plasma, flame) are nowadays used with advantage for the surface treatment of the adherend, for the purpose of achieving a higher anchoring force with a self-adhesive tape.

Where two or more than two layers are to be laminated to one another, one or both interfaces are typically pretreated physically prior to the lamination.

It is known that treatment by corona and plasma has limited durability in respect of the activation of the boundary layer, and so treatment takes place at a time near to or predominantly directly before the laminating operation.

Plasma and corona pretreatments are described or referred to for example in DE 2005 027 391 A1 and DE 103 47 025 A1.

In DE 10 2007 063 021 A1 it is claimed that the prior plasma/corona pretreatment is beneficial for the holding power and the flow-on behavior of the adhesive bond. There was no recognition that the process may produce an increase in the bond strength.

DE 10 2006 057 800 A1 claims a multi-ply adhesive tape comprising at least with two pressure-sensitive adhesives A and B which lie directly on one another and which are each pretreated chemically and/or physically prior to lamination. The improved integral adhesion of the layers of pressure-sensitive adhesive that is achieved by this means is obtained by both-sided equal-sided nature of the pretreatment.

In relation to corona treatments under process gas atmosphere, DE 44 38 533 A1 describes a process for corona treatment that includes process gas such as, for example, carbon dioxide or carbon monoxide and also other gases, which are referred to therein as inert gases, such as nitrogen or argon, for example.

Further known prior art is published via DE 10 2007 011 235 A1 to Plasmatreat GmbH, Steinhagen, which describes an improved pretreatment, more particularly cleaning of a surface of a workpiece. For example, adhesive bonding to another workpiece may be considerably improved.

In EP 0 740 681 B1, moreover, the treatment is disclosed at the surface of a polymer or polymer matrix composite material by means of plasma/corona and a coupling agent, and the application of an adhesive or a self-adhesive tape.

Plasma treatment, in particular with a suitable process gas, of heat-activatable tackifying resin layers and hotmelt layers are also known for a high strength of bonding to a pressure-sensitive adhesive layer.

Examples of the latter are found in EP 1 262 532 B1, which is directed to a dual-functional adhesive tape, comprising a heat-activatable tackifying resin layer based on polyolefin and a pressure-sensitive adhesive layer based on acrylate, the polyolefin layer being $N_2$ corona treated, in order in this way to achieve effective anchoring to the pressure-sensitive adhesive layer.

A feature of the prior art is that the pretreatments relate predominantly to the carrier material or to the adherend, in order to build up a higher anchoring force to the adhesive or self-adhesive tape.

It is an object of the invention to find further positive effects in the case of physical surface modification of pressure-sensitive adhesives and carrier materials, in order to achieve high-strength bonds. The nub of the object is the achievement of a high anchoring between the pressure-sensitively adhesive layer and carrier material; as a secondary aspect, the aim is also to fulfill the object when a relatively long time period lies between the physical treatment and lamination.

SUMMARY

The invention relates accordingly to an adhesive tape, preferably self-adhesive tape, comprising at least two layers A and B laminated directly to one another, at least one or both layers A or B being an adhesive, and the interfaces of the layers A and B that are laminated to one another being subjected to a physical method, the physical method being selected from the group of corona discharge, dielectric barrier discharge, flame pretreatment or plasma treatment, before the layers are laminated to one another, and the two methods differing from one another.

A physical method for the purposes of this invention is a method which through electrical discharges generates a plasma and exposes the target substrate to said plasma.

DETAILED DESCRIPTION

For the purposes of this invention, the treatment takes place under a pressure which lies close to or at atmospheric pressure. The average electron velocity in the plasma is usually very high, with its average kinetic energy much higher than that of the ions. Accordingly, an electron temperature defined by way of this energy is different from the temperature of the ions, and the plasma is not at thermal equilibrium: it is "cold".

The physical pretreatment technique commonly referred to as "corona" is usually a "dielectric barrier discharge" (DBD); in this regard, see also Wagner et al., Vacuum, 71 (2003), 417 to 436. It involves the target substrate being passed through in web form between two high-voltage electrodes, at least one electrode consisting of a dielectric material or being coated therewith.

The treatment intensity of a corona treatment is stated as the "dose" in [$Wmin/m^2$], with the dose $D=P/b*v$, where $P$=electrical power [W], $b$=electrode breadth [m], and $v$=web speed [m/min].

By means of a suitably high web tension, the substrate is pressed onto the counterelectrode, configured as a roll, in order to prevent air inclusions. The treatment distance is typically about 1 to 2 mm. A fundamental disadvantage of a two-electrode geometry of this kind with a treatment in the space between electrode and counterelectrode is the possible reverse-face treatment. In the event of very small inclusions of air or gas on the reverse face, as for example if the web tension is too low in the case of roll-to-roll treatment, there is a usually unwanted corona treatment of the reverse face.

In the case of treatment with high-frequently alternating voltage in the kV range, discrete discharge channels briefly come about between electrode and substrate, and accelerated electrons also strike the surface of the substrate. When the electrons strike, the energy may amount to two to three times the bond energy of the usual molecular bonds of a plastics substrate, and may therefore break open this substrate. Secondary reactions give rise to functional and polar groups in the surface. The formation of polar groups makes a strong contribution, for example, to raising the surface energy. As a result of the action of the high-energy accelerated electrons, a treatment of this kind is very efficient in respect of the electrical energy used, and very powerful, based on the possible reactions initiated. The generation of a high density of polar and functional groups, however, is in competition with the degradation of material through chain breakages and oxidation.

The simple corona treatment or DBD is used customarily for the treatment of nonpolar surfaces and films, so that their surface energy and wettability increases. For instance, polymeric films are often subjected to corona treatment prior to printing or the application of adhesives.

Although, in a wider sense, a corona treatment in air is a technique in which plasma plays a part, a narrower definition is customarily understood for a plasma treatment at atmospheric pressure.

If a corona treatment takes place in a gas mixture other than air, such as one based on nitrogen, for example, plasma is already relevant in part. In the narrower sense, however, an atmospheric pressure plasma treatment is a homogeneous and discharge-free treatment. A homogeneous plasma of this kind can be generated, for example, through use of noble gases, in some cases with admixtures. This treatment takes place in a substantially two-dimensional reaction space filled homogenously with plasma.

The reactive plasma comprises radicals and free electrons which are able to react rapidly with numerous chemical groups in the substrate surface. This leads to the formation of gaseous reaction products and highly reactive, free radicals in the surface. Through secondary reactions, these free radicals are able to undergo further reaction rapidly with oxygen or other gases, and form various chemical functional groups on the substrate surface. As with all plasma techniques, the generation of functional groups is in competition with degradation of the material.

The target substrate can also be exposed not to the reaction space of a two-electrode geometry but instead only to the discharge-free plasma ("indirect" plasma). In that case, in good approximation, the plasma is usually also free of potential. This plasma is expelled from the discharge zone usually by a stream of gas and, after a short section, is conveyed onto the substrate, without the need for a counterelectrode. The lifetime (and hence also the useful section) of the reactive plasma, often called "afterglow" is determined by the precise details of the recombination reactions and the plasma chemistry. The reactivity is usually observed to decline exponentially with the distance from the discharge source.

Modern indirect plasma techniques are often based on a nozzle principle. The nozzle here may be of round or linear configuration; in some cases, rotary nozzles are operated—there is no desire here to impose any restriction. A nozzle principle of this kind is advantageous on account of its flexibility and its inherently single-sided treatment. Such nozzles, from the company Plasmatreat for example, are widespread in industry for the pretreatment of substrates prior to adhesive bonding. A disadvantage is the indirect treatment, which, being discharge-free, is less efficient, and hence the reduced web speeds. The customary constructional form of a round nozzle, however, is especially suitable for treating narrow webs of product, such as an adhesive tape with a breadth of a few cm, for example.

There are a variety of plasma generators on the market, differing in the plasma generation technology, the nozzle geometry, and the gas atmosphere. Although the treatments differ in factors including the efficiency, the fundamental effects are usually similar and are determined above all by the gas atmosphere employed. Plasma treatment may take place in different atmospheres, and the atmosphere may also include air. The treatment atmosphere may be a mixture of different gases, selected inter alia from $N_2$, $O_2$, $H_2$, $CO_2$, Ar, He, ammonia, it also being possible, moreover, for steam or other constituents to have been admixed. This exemplary recitation does not impose any restriction.

In principle it is also possible to admix the atmosphere with coating or polymerizing constituents, in the form of gas (ethylene for example) or liquids (in atomized form as aerosol). There is virtually no restriction on the aerosols that are suitable. The indirectly operating plasma techniques in particular are suitable for the use of aerosols, since there is no risk of fouling of the electrodes.

Since the effects of a plasma treatment are of chemical nature and the focus is on changing the surface chemistry, the methods described above may also be described as chemical-physical treatment methods. Although there may be differences in the detail, no particular technique is to be emphasized for the purposes of this invention, in terms neither of the nature of the plasma generation nor of the mode of construction.

According to one preferred embodiment of the invention, the interfaces laminated to one another possess an acid-base interaction or donor-acceptor interaction that is intensified or generated by the different types of physical treatments of the interfaces, more particularly through use of complementary process gases, more particularly through use of an oxidizing gas and a reducing gas, more particularly through use of an acidically modifying gas and of a basically modifying gas.

Particularly preferred is a process in which the first physical treatment is a corona treatment in air and the second physical treatment is a corona treatment in N2, the O2 content of the N2 atmosphere being preferably <1000 ppm, more preferably <100 ppm, especially preferably <20 ppm, very preferably <10 ppm.

The results found in accordance with the invention (see example 4 in particular) can be understood on the basis of acid-base interactions. The air corona generates primarily oxygen-containing groups (carboxylic acids for example) on the surface of the foam, which are able to interact to particular advantage with nitrogen-containing groups (primary and secondary amino groups for example) that have been incorporated by the nitrogen corona on the surface of the adhesive. The term "interactions" is intended in this context to include all customary gradational extents of such interactions, up to and including a bond with covalent character. Specific donor-acceptor interactions of this kind stand out in particular from a pure unspecific dipole-dipole interaction.

Known in principle is the modification of the acid-base interactions of a surface by means of physical methods for improving the ease of incorporation of fillers—see, for example, DE 690 21 774 T2. This invention does away with the need for adapting a surface to a mandated condition (defined reaction chemistry, surrounding matrix, etc.) and provides a process with which both surfaces can be made complementary to one another.

The acidity or basicity of a surface can be expressed by the surface $pK_a$ (or $pK_b$). This value is closely related to the local pH and to the charge density per unit area on the surface. An alternative description can be given in the sense of the Lewis donor-acceptor concept. The formation of hydrogen bonds as well is based on a donor-acceptor interaction.

The acidity or basicity of a surface can be measured for example using the method of contact angle titration (see for example Bain et al., Langmuir, Vol. 5, No. 6, 1989). Other methods might be to determine surface energy with its acid and basic components by the method of van Oss, or to estimate the density of functional groups per unit area by means of derivitization and/or colorimetric determination. In principle it must be borne in mind that in the case of surfaces with mixed functionality it is possible to measure a plurality of $pK_a$ values, and that the acidity or basicity is an average property of the surface. Fundamentally, the terms "acidic" and "basic" have fuzzy definitions, though it is always possible, between two given functional groups, to determine which by comparison is more acidic or more basic.

If a suitable physical surface treatment increases the difference between the surface $pK_a$ values, and/or raises the density of complementary donor and acceptor functionalities per unit area, this makes a positive contribution to the anchoring strength. In the sense of deliberate increasing of donor-acceptor interactions, it is possible to talk of "complementary physical treatments" with "complementary process gases".

If functional groups normally characterized as acidic are incorporated into a surface by means of a physical treatment and a suitable treatment atmosphere, the relevant gases are referred to for the purposes of the invention as acidically modifying gases. Usually these are gases which introduce one or more oxygen atoms into the surface. In the technical sphere, such gases are usually identified as oxidizing.

The complementary functional groups in this scenario are those commonly characterized as basic. Treatment atmospheres by means of which such basic functional groups are incorporated into the surface are referred to in the context of this invention as basically modifying gases. Usually these are gases which introduce one or more nitrogen atoms into the surface. This is often the case for gases which are identified technically as being reducing.

These definitions are also encountered in U.S. Pat. No. 7,147,758 B2, which describes the modification of a surface by means of selected oxidizing and reducing gases.

Without wishing to impose any restriction, acidically modifying gases may be the following: O2, O3, CO2, CO, H2O, or else SO2, or else gaseous carboxylic acids, ketones, or aldehydes, or mixtures thereof.

Without wishing to impose any restriction, basically modifying gases may be as follows: N2, H2, NH3, or mixtures thereof.

These gases may also be present as admixtures in a carrier gas, as for example in an inert gas such as a noble gas, or in a gas having a significantly lower reactivity.

In principle the treatment must be suitable for producing or reinforcing complementary donor-acceptor interactions. In certain cases it is also possible for treatments of the surfaces with both atmospheres to be selected, from a single group, such as the acidically modifying gases, or an atmosphere with a mixture of acidically and basically modifying gases.

In principle this concept applies to donor-acceptor interactions beyond an acid-base interaction.

The treatments could also in principle be carried out by a different physical method such as a plasma treatment.

As shown in example 4b, this concept may find application in the treatment of PE-based carrier foams for pressure-sensitive adhesives, which are frequently contaminated on the surface with adhesion-reducing process auxiliaries such as stearates. In this case an aggressively oxidizing, oxygen-based treatment is particularly efficient. In line with our invention, a complementary nitrogen-based physical treatment of the pressure-sensitive adhesive to be laminated on could then be selected. This nitrogen-based modification of the surface of the adhesive is able to exhibit a positive effect even in the case of strongly acid-containing adhesives, surprisingly.

According to one preferred embodiment of the invention at least one of the layers A or B is viscoelastic.

A viscoelastic polymer layer may be regarded as a very high-viscosity liquid which under a pressure load exhibits the behavior of flow (also referred to as "creep"). Such viscoelastic polymers or a polymer layer of this kind possess to a particular degree the capacity, on slow exposure to force, to relax the forces which are acting on them: they are capable of dissipating the forces into vibrations and/or deformations (which in particular may also be—at least in part—reversible), and therefore "buffering" the acting forces, and preferably of preventing mechanical destruction by the acting forces, but advantageously at least reducing said forces or else at least delaying the time of the onset of destruction. In the case of a force which acts very rapidly, viscoelastic polymers customarily display an elastic behavior, in other words behavior of a fully reversible deformation, where forces which go beyond the elasticity capacity of the polymers may lead to breakage. Contrasting with this are elastic materials, which exhibit the described elastic behavior even under slow exposure to force. Viscoelastic adhesives of these kinds may be varied greatly in addition, in terms of their properties, by means of admixtures, fillers, foaming, or the like.

In view of the elastic components of the viscoelastic polymer layer, which in turn make an essential contribution to the technical adhesive properties for adhesive tapes with a viscoelastic carrier layer of such a kind, the tension, for example, of a tensile or shearing stress is unable completely to relax. This is expressed by the relaxation capacity, which is defined as $((\text{tension}(t=0)-\text{tension}(t)/\text{tension }(t=0))*100\%$. Viscoelastic carrier layers typically display a relaxation capacity of more than 50%.

With further preference the adhesive is a pressure-sensitive adhesive (PSA), this being an adhesive which even under relatively weak applied pressure allows permanent joining to virtually all substrates and which after use can be detached from the substrate again substantially without residue. The action of a PSA at room temperature is one of permanent pressure-sensitive adhesion—that is, it has a sufficiently low viscosity and a high tack, so that it wets the surface of the respective bonding substrate under just low applied pressure. The bondability of the adhesive derives from its adhesive properties, and the redetachability from its cohesive properties.

The layer of pressure-sensitive adhesive is based preferably on natural rubber, synthetic rubber, or polyurethanes, and the layer of pressure-sensitive adhesive consists preferably of pure acrylate or predominantly of acrylate.

To improve the adhesive properties, the PSA may have been blended with tackifiers. Tackifiers, also referred to as tackifying resins, are suitably, in principle, all known classes of compound. Tackifiers are, for example, hydrocarbon resins (for example, polymers based on unsaturated $C_5$ or $C_9$ monomers), terpene-phenolic resins, polyterpene resins based on raw materials such as, for example, α- or β-pinene, aromatic resins such as coumarone-indene resins, or resins based on styrene or α-methylstyrene such as rosin and its derivatives, as for example disproportionated, dimerized, or esterified rosin, examples being reaction products with glycol, glycerol, or pentaerythritol, to name but a few. Preferred resins are those without easily oxidizable double bonds, such as terpene-phenolic resins, aromatic resins, and more preferably resins prepared by hydrogenation, such as hydrogenated aromatic resins, hydrogenated polycyclopentadiene resins, hydrogenated rosin derivatives, or hydrogenated polyterpene resins, for example. Resins based on terpene-phenols and rosin esters are preferred. Likewise preferred are tackifying resins having a softening point of more than 80° C. to ASTM E28-99 (2009). Particularly preferred resins are those based on terpene-phenols and rosin esters with a softening point above 90° C. to ASTM E28-99 (2009). Typical amounts for use are 10 to 100 parts by weight, based on polymers of the adhesive.

For further improvement in the cable compatibility the adhesive formulation may optionally have been blended with light stabilizers or primary and/or secondary aging inhibitors.

Aging inhibitors used may be products based on sterically hindered phenols, phosphites, thiosynergists, sterically hindered amines, or UV absorbers.

Used with preference are primarily antioxidants such as, for example, Irganox 1010 (tetrakis(methylene-(3,5=di-(tert)-butyl-4-hydrocinnamate))methane; CAS No. 6683-19-8 (sterically hindered phenol), BASF), or Irganox 254, alone or in combination with secondary antioxidants such as, for example, Irgafos TNPP or Irgafos 168.

The aging inhibitors can be used in any desired combination with one another, with mixtures of primary and secondary antioxidants in combination with light stabilizers such as, for example, Tinuvin 213 displaying particularly good aging inhibition effect.

Having proven especially advantageous are aging inhibitors in which a primary antioxidant is combined with a secondary antioxidant in one molecule. These aging inhibitors are cresol derivatives whose aromatic ring is substituted at two arbitrary, different locations, preferably in ortho- and meta-positions to the OH group, by thioalkyl chains, it also being possible for the sulfur atom to be joined to the aromatic ring of the cresol building block via one or more alkyl chains. The number of carbon atoms between the aromatic system and the sulfur atom may be between 1 and 10, preferably between 1 and 4. The number of carbon atoms in the alkyl side chain may be between 1 and 25, preferably between 6 and 16. Particularly preferred in this context are compounds of the type of 4,6-bis(dodecylthiomethyl)-o-cresol, 4,6-bis(undecylthiomethyl)-o-cresol, 4,6-bis(decylthiomethyl)-o-cresol, 4,6-bis(nonylthiomethyl)-o-cresol or 4,6-bis(octylthiomethyl)-o-cresol. Aging inhibitors of this kind are available for example from Ciba Geigy under the name Irganox 1726 or Irganox 1520.

The amount of aging inhibitor added or or aging inhibitor package added ought to be located within a range between 0.1 and 10 wt %, preferably in a range between 0.2 and 0.5 wt %, more preferably in a range between 0.5 and 3 wt %, based on the total solids content.

For improving the processing properties, the adhesive formulation may additionally have been blended with customary process auxiliaries such as defoamers, deaerating agents, wetting agents, or flow control agents. Suitable concentrations are in the range from 0.1 to 5 parts by weight, based on the solids.

Fillers (reinforcing or nonreinforcing) such as silicon dioxides (spherical, acicular, lamellar, or irregular such as the pyrogenic silicas), glass in the form of solid or hollow beads, microballoons, calcium carbonates, zinc oxides, titanium dioxides, aluminum oxides, or aluminum oxide hydroxides may serve both for adjusting the processing properties and also the technical adhesive properties. Suitable concentrations are in the range from 0.1 up to 20 parts by weight, based on the solids.

Microballoons particularly are preferred, since they allow foaming of the adhesive.

In accordance with a further advantageous embodiment, the layer B is a carrier substrate in web form, more particularly a film (made from PE, PP, PS or PET), foam, fabric, nonwoven, or paper carrier or a composite carrier.

The adhesive tape may comprise one or more layers of films or foam carriers.

The adhesive tape may further comprise one or more functional layers such as barrier layers, layers of hotmelt-capable material, or other functional layers.

The carrier preferably has viscoelastic properties.

According to a further advantageous embodiment, layer B is the adhesive bonding component to which the pressure-sensitive adhesive is applied.

In accordance with the invention there are a number of possible variants of the invention such that the two physical methods differ from one another.

In the simplest form, the physical methods differ in respect of the selected process. In addition, two or more methods may be used on an interface. The sum totals of each of the methods employed may in that case differ in one or more summands.

They may then differ in respect of the process parameters set, especially the dose which is suitable for both interfaces, the pressure, the temperature, or the gas flow present during the treatment.

Alternatively or additionally the treatment time for the interfaces of the layers A and B may be different.

According to a further advantageous embodiment, the interfaces of the layers A and B are treated uniformly and/or over the full area.

Alternatively the interfaces of the layers A and B may be given a structured treatment, meaning that zones or strips within the interface are treated differently.

It is also within the concept of the invention for the interfaces of the layers A and B to be treated partially.

It is fundamentally surprising, then, to the skilled person that through the treatment of the surface of an adhesive by a physical or chemical-physical method it is possible to achieve an increase in the bond strength. Since all of these methods entail chain breakages and degradation of material, the formation of a layer with a high polar group content but low internal cohesion would be expected.

To the skilled person it is surprising, moreover, that in the treatment of the surface of an adhesive using an indirect plasma, an effect can be achieved, i.e., an increasing of the bond strength, which is comparable with, or even exceeds, that of a corona treatment.

Surprisingly, a suitable plasma treatment of the adhesive prior to application may even make it unnecessary to use an adhesion promoter or primer. The emission of primer is advantageous for a variety of reasons, primarily in order to reduce complexity and expense.

The adhesive tape of the invention has the capacity to outstandingly overcome the following disadvantages known hitherto in the state of the art:

The omission of a physical treatment of interfaces generally leads to insufficient anchoring strength of laminated layers.

Single-sided corona/plasma treatments of a boundary layer before lamination permits limited increase in the anchoring strength.

In the case of the single-sided treatments, a moderate to high corona dose is used to achieve sufficient activation, this dose also frequently being associated with damage and change to the interface or to the reverse face of the layer.

The two-sided pretreatment of the layers to be laminated may take place with a low dose in each case, reducing above-described damage and change to a minimum.

Even after heat and humidity treatment over a prolonged time period, cohesive splitting occurs in the T-peel test or bond strength test.

Relatively long activation of the pretreated layers is achieved, and so lamination may be performed by a later point in time, but the anchoring forces attained are similarly high, corresponding to an immediate lamination.

In accordance with the invention, after a prolonged time period between physical pretreatment and lamination, anchoring forces are obtained that are equivalent to or higher than those in the case of a treatment with immediate lamination.

Test Methods

Test Method 1 (90° Bond Strength to Steel)

The bond strength to steel is determined under test conditions of 23° C.+/−1° C. temperature and 50%+/−5% relative humidity. The specimens were cut to a breadth of 20 mm and adhered to a steel plate. Prior to the measurement, the steel plate is cleaned and conditioned. This is done by first wiping the plate with acetone and then leaving it to lie in the air for 5 minutes to allow the solvent to evaporate.

Unless otherwise described, the specimens were laminated on an etched PET film 23 μm thick, allowing the PET film to be clamped in for the tensile test. The anchoring of the adhesive to the PET film was always good enough that no delamination from the PET film was ever observed.

The test specimen was applied to the steel substrate and then pressed on five times using a 2 kg roller with a rolling speed of 10 m/min. Unless otherwise indicated, this was followed by storage at 40° C. for 7 days, with subsequent one-hour reconditioning in the test conditions.

For the measurement, the steel plate was inserted into a special mount which allows the specimen to be pulled off vertically upward at an angle of 90°. The bond strength measurement was made using a Zwick tensile testing machine. The measurement results are reported in N/cm and are averaged from three measurements.

Test Method 2 (T-Peel Bond Strength)

The T-Peel bond strength is determined under test conditions of 23° C.+/−1° C. temperature and 50%+/−5% relative humidity. Basically a two-layer assembly is produced, and the bond strength (or release force) of this assembly is measured by pulling in a geometry which when viewed from the side resembles a horizontal "T".

Unless otherwise described, the adhesive specimens were laminated on an etched PET film 23 μm thick, allowing the PET film to be clamped in for the tensile test. The anchoring of the adhesive to the PET film was always good enough that no delamination from the PET film was ever observed. If a substrate was not adhesive, it was clamped in directly.

The two substrates were laminated by hand to form two-layer specimens, which were cut to a breadth of 20 mm and then pressed on five times using a 2 kg roller with a rolling speed of 10 m/min. This was followed by storage at 40° C. for 7 days, with subsequent one-hour reconditioning in the test conditions.

For the measurement, both substrates were clamped into one jaw each of a Zwick tensile testing machine, and the "T" formed by the substrate was supported by hand. The measurement results are reported in N/cm and are averaged from three measurements.

Glass Transition Temperature

The static glass transition temperature is determined via dynamic scanning calorimetry in accordance with DIN 53765. The glass transition temperature $T_g$ data relate to the glass transformation temperature value $T_g$ in accordance with DIN 53765:1994-03, unless otherwise indicated in the particular case.

Molecular Weights

The average molecular weight $M_w$ and the polydispersity D were determined by means of gel permeation chromatography (GPC). The eluent used was THF with 0.1 vol % trifluoroacetic acid. Measurement took place at 25° C. The preliminary column used was PSS-SDV, 5 μm, 103 Å (10-7 m), ID 8.0 mm×50 mm. Separation took place using the columns PSS-SDV, 5 μm, 103 Å (10-7 m), 105 Å (10-5 m) and 106 Å (10-4 m) each with ID 8.0 mm×300 mm. The sample concentration was 4 g/l, the flow rate 1.0 ml per minute. Measurement took place against PMMA standards.

Solids Content:

The solids content is a measure of the fraction of unevaporable constituents in a polymer solution. It is determined gravimetrically by weighing the solution, then vaporizing the evaporable fractions in a drying cabinet at 120° C. for 2 hours, and weighing the residue.

K Value (According to FIKENTSCHER):

The K value is a measure of the average molecule size for high-polymer compounds. For the measurement, one percent strength (1 g/100 ml) toluenic polymer solutions were prepared and their kinematic viscosities were determined with the aid of a Vogel-Ossag viscometer. After standardization to the viscosity of the toluene, the relative viscosity is obtained, from which the K value can be calculated by the method of Fikentscher (polymer 8/1967, 381 ff.).

The invention is to be elucidated in more detail below, with reference to a number of examples, without wishing thereby to impose restriction of any kind whatsoever.

EXAMPLES

In all examples with N2 corona treatment, the O2 content of the treatment atmosphere was <10 ppm.

Example 1

Improved Long-Term Activation

Off-Line Storability (Definition: Time Period Between Treatment and Lamination of the Two Layers)

In an experiment a viscoelastic carrier and a PSA, a resin-modified acrylate adhesive, were treated with the following parameters.

Preparation of the Exemplary Viscoelastic Polymer VP (Carrier)

A reactor conventional for radical polymerizations was charged with 54.4 kg of 2-ethylhexyl acrylate, 20.0 kg of methyl acrylate, 5.6 kg of acrylic acid, and 53.3 kg of acetone/isopropanol (94:6). After nitrogen gas had been passed through the reactor for 45 minutes, with stirring, the reactor was heated to 58° C. and 40 g of AIBN were added. The external heating bath was then heated 75° C. and the reaction was carried out constantly at this external temperature. After 1 hour a further 40 g of AIBN were added, and after 4 hours dilution took place with 10 kg of acetone/isopropanol mixture (94:6). After a reaction time of 22 hours, the polymerization was discontinued and the batch was cooled to room temperature.

This polymer was then processed further in a hotmelt process by customary methods. In summary, first the solvent was removed under reduced pressure in a concentrating extruder (residual solvent content ≤0.3 wt %) and heating was carried out. In a twin-screw extruder, a crosslinker and accelerator system was added, consisting of pentaerythritol tetraglycidyl ether (Polypox® R16) and triethylene tetramine (Epikure® 925). After compounding, the hotmelt was coated on a process liner, using a two-roll calender.

Presentation of the Exemplary Pressure-Sensitive Polyacrylate Adhesive PA

A 100 l glass reactor conventional for radical polymerization was charged with 4.8 kg of acrylic acid, 11.6 kg of butyl acrylate, 23.6 kg of 2-ethylhexyl acrylate, and 26.7 kg of acetone/benzine 60/95 (1:1). After nitrogen gas had been passed through the reactor for 45 minutes with stirring, the reactor was heated to 58° C. and 30 g of AIBN were added. The external heating bath was then heated at 75° C. and the reaction was carried out constantly at this external temperature. After a reaction time of 1 hour a further 30 g of AIBN were added. After 4 hours and 8 hours, dilution took place with 10.0 kg each time of acetone/benzine 60/95 (1:1) mixture. After a reaction time of 24 hours, the reaction was discontinued and the batch was cooled to room temperature. The polyacrylate was subsequently blended with Uvacure® 1500, diluted to a solids content of 30% with acetone, and then coated from solution onto a siliconized release film (50 µm polyester) or onto an etched PET film 23 µm thick.

| Specimen | Layer A: produced by method VP Dose [Wmin/m²] | Layer A: produced by method VP Process gas | Layer B: produced by method PA Dose [Wmin/m²] | Layer B: produced by method PA Process gas | Long-term activation [shelf life] |
|---|---|---|---|---|---|
| 1 | untreated | | untreated | | poor |
| 2 | 33 | nitrogen | untreated | | poor |
| 3 | 33 | air | 33 | air | poor |
| 4 | 100 | air | 100 | air | poor |
| 5 | 33 | nitrogen | 33 | air | good |
| 6 | 33 | nitrogen | 100 | air | good |
| 7 | 100 | nitrogen | 33 | air | very good |
| 8 | 100 | nitrogen | 100 | air | very good |

The measurement variable selected for the integral strength between the two layers was the anchoring force, which was measured in accordance with the T-Peel test method.

The lamination of the layers A and B was performed immediately and after storage for 3 days, for 15 days, and for 30 days. The measurement variable selected for the integral strength between the two layers, referred to below as laminate, was the anchoring force, which was measured in accordance with the T-Peel test method (see test method).

It is known that activation with air is subject to a decay curve which shows a high drop in the initial days.

It is therefore also claimed that the air functionalities introduced in the layer B are not degraded over the storage time period, and are subject to chemical-physical interaction with the nitrogen functionalities introduced in the layer A, for the development of a high anchoring force.

Figure 1:
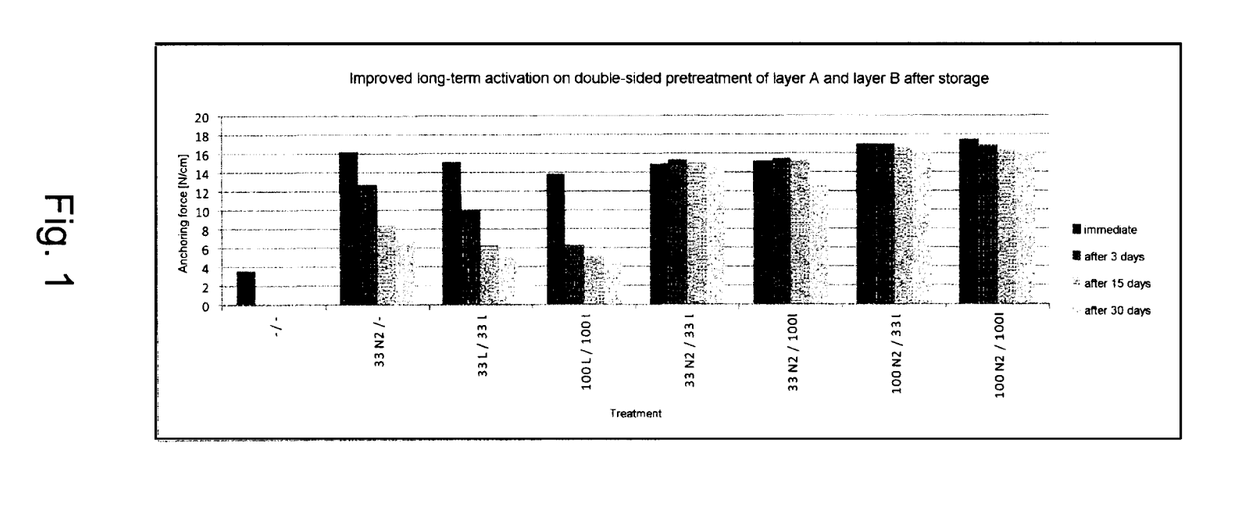
FIG. 1 illustrates the improved long term activation on double-sided treatment of layers A&B after storage

The denotation beneath the groups of bars shows the dose and the process gas.

For the diagram and the table, the notation for the treatment should be read as follows:

| Laminate of treated layer A and treated layer B | Treatment of layer A Dose [Wmin/m²] | Treatment of layer A Process gas | Treatment of layer B Dose [Wmin/m²] | Treatment of layer B Process gas |
|---|---|---|---|---|
| —/— | untreated | | untreated | |
| 33N₂/— | 33 | nitrogen | untreated | |
| 33L/33L | 33 | air | 33 | air |
| 100L/100L | 100 | air | 100 | air |
| 33N₂/33L | 33 | nitrogen | 33 | air |
| 33N₂/100L | 33 | nitrogen | 100 | air |
| 100N₂/33L | 100 | nitrogen | 33 | air |
| 100N₂/100L | 100 | nitrogen | 100 | air |

| | | Laminate of treated layer A and treated layer B | Measurement 1 | Measurement 2 | Measurement 3 | Average value of anchoring force [N/cm] |
|---|---|---|---|---|---|---|
| Lamination: | immediate | —/— | 3.6 | 3.7 | 3.7 | 3.7 |
| Storage: | 7 days 40° C. | 33 L/33 L | 15.2 | 15.3 | 15.1 | 15.2 |
| | | 33 L/100 L | 15.5 | 15.6 | 15.4 | 15.5 |
| | | 33 N2/— | 16.3 | 16.3 | 16.0 | 16.2 |
| | | 33 N2/33 L | 14.8 | 14.9 | 15.1 | 14.9 |
| | | 33 N2/33 N2 | 15.2 | 15.3 | 15.3 | 15.2 |

| Laminate of treated layer A and treated layer B | Measurement 1 | Measurement 2 | Measurement 3 | Average value of anchoring force [N/cm] |
|---|---|---|---|---|
| 33 N2/100L | 15.2 | 15.3 | 15.3 | 15.2 |
| 100 L/33 L | 17.4 | 17.4 | 17.5 | 17.4 |
| 100 L/100 L | 14.0 | 14.0 | 13.6 | 13.9 |
| 100 N2/— | 17.7 | 17.7 | 17.4 | 17.6 |
| 100 N2/33 L | 17.1 | 17.0 | 17.2 | 17.1 |
| 100 N2/100L | 17.7 | 17.6 | 17.1 | 17.5 |

| | | 1 | 2 | 3 | Average value |
|---|---|---|---|---|---|
| Lamination: | after 3 days —/— | | | | |
| Storage: | 7 days 40° C. 33 L/33 L | 9.9 | 9.8 | 10.5 | 10.1 |
| | 33 L/100 L | 7.4 | 7.3 | 7.4 | 7.4 |
| | 33 N2/— | 13.2 | 12.9 | 12.5 | 12.8 |
| | 33 N2/33 L | 15.4 | 15.4 | 15.2 | 15.4 |
| | 33 N2/33 N2 | | | | |
| | 33 N2/100L | 15.5 | 15.5 | 15.4 | 15.5 |
| | 100 L/33 L | 7.4 | 7.4 | 7.4 | 7.4 |
| | 100 L/100 L | 6.3 | 6.3 | 6.3 | 6.3 |
| | 100 N2/— | 17.8 | 17.7 | 17.6 | 17.7 |
| | 100 N2/33 L | 16.7 | 17.3 | 17.0 | 17.0 |
| | 100 N2/100L | 17.1 | 17.0 | 16.6 | 16.9 |

| | | 1 | 2 | 3 | Average value |
|---|---|---|---|---|---|
| Lamination: | after 15 days —/— | | | | |
| Storage: | 7 days 40° C. 33 L/33 L | 6.3 | 6.4 | 6.4 | 6.4 |
| | 33 L/100 L | 5.0 | 5.1 | 5.0 | 5.0 |
| | 33 N2/— | 8.6 | 8.5 | 8.4 | 8.5 |
| | 33 N2/33 L | 15.1 | 15.0 | 15.2 | 15.1 |
| | 33 N2/33 N2 | | | | |
| | 33 N2/100L | 15.6 | 15.2 | 15.5 | 15.4 |
| | 100 L/33 L | 5.6 | 5.6 | 5.5 | 5.6 |
| | 100 L/100 L | 5.2 | 5.1 | 5.1 | 5.1 |
| | 100 N2/— | 15.5 | 14.5 | 15.2 | 15.1 |
| | 100 N2/33 L | 16.8 | 16.7 | 16.7 | 16.7 |
| | 100 N2/100L | 16.3 | 16.4 | 16.3 | 16.3 |

| | | 1 | 2 | 3 | Average value |
|---|---|---|---|---|---|
| Lamination: | after 30 days —/— | | | | |
| Storage: | 7 days 40° C. 33 L/33 L | 5.3 | 5.1 | 5.2 | 5.2 |
| | 33 L/100 L | 4.4 | 4.4 | 4.4 | 4.4 |
| | 33 N2/— | 7.0 | 7.1 | 7.0 | 7.0 |
| | 33 N2/33 L | 15.0 | 14.9 | 14.9 | 14.9 |
| | 33 N2/33 N2 | | | | |
| | 33 N2/100L | 12.8 | 12.5 | 12.4 | 12.6 |
| | 100 L/33 L | 4.8 | 4.9 | 4.8 | 4.8 |
| | 100 L/100 L | 4.5 | 4.5 | 4.5 | 4.5 |
| | 100 N2/— | 11.4 | 11.1 | 11.4 | 11.3 |
| | 100 N2/33 L | 16.2 | 16.1 | 16.1 | 16.1 |
| | 100 N2/100L | 16.2 | 16.3 | 15.9 | 16.2 |

Comparative Example 1

Specimens 3 and 4

It is found that the equal treatment of interfaces exhibits a significant drop in the anchoring forces after just three days of off-line storage.

Comparative Example 2

Specimens 5 and 8

Surprisingly, however, it was possible to find in particular that with an equal dose at different kinds of treatment atmosphere, the anchoring force exhibited is virtually the same even after 30 days.

Comparative Example 3

Specimen 5 with 8

Treatments with a dose the same on both sides but three times lower than in example 2 and with different process gas show a stable effect over the entire storage time period, and significantly high anchoring force values, where the skilled person would actually have expected significantly lower values.

With combinations selected in a skilful way, there is a large operating window, as may be seen from the results for specimens 5, 6, 7, and 8.

Example 2

Increased Bond Strengths

Surprisingly for the skilled person it was also possible to find that the anchoring force between two differently treated carriers (layer VP and layer PA) show an anchoring force which is higher overall than the carriers treated single-sidedly and treated in the same way double-sidedly.

In this example the layers were treated with an indirect PlasmaLine plasma process from VITO, Belgium (Plasma-Line®) in nitrogen as process gas. Via a slot nozzle, a linear atmospheric plasma is blown out via the process gas onto the carrier to be treated.

Test method analogous to example 1, but layers A and B laminated immediately

Example 2a

Figure 2:
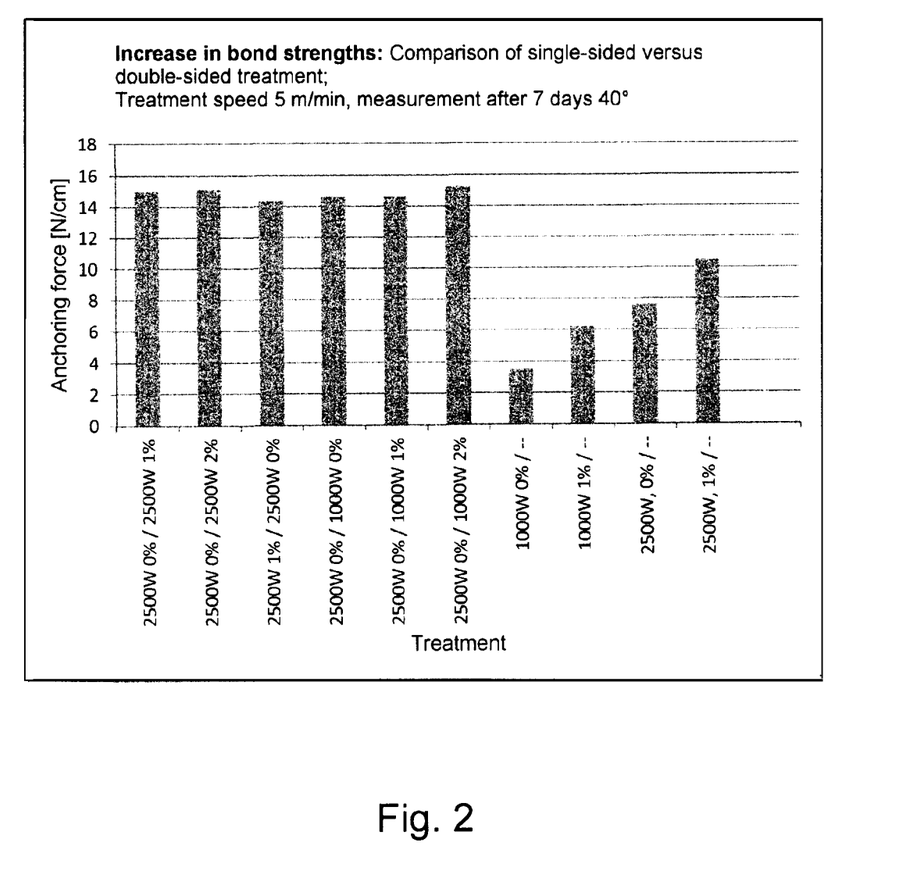
FIG. 2 illustrates the higher anchoring forces on different double-sided treatment versus single-sided treatment

Verification of a Higher Anchoring Force on Suitably Set Double-Sided Treatment Relative to Single-Sided Treatment In this experiment, fractions of carbon dioxide were added to the principal nitrogen process gas. As an example, a list will be given here of how the treatment parameters in the table below and FIG. 2 are to be read:

|  | Layer A | | Layer B | |
| --- | --- | --- | --- | --- |
| Treatment | Electrical power [W] | $CO_2$ fraction in $N_2$ process gas [%] | Electrical power [W] | $CO_2$ fraction in $N_2$ process gas [%] |
| 2500 W 0%/2500 W 2% | 2500 | 0 | 2500 | 2 |
| 1000 W 0%/— | 1000 | 0 | 0 | 0 |

The electrical power reported is based on the treatment breadth of the discharge unit, of 400 mm.

Experimental Parameters 1

|  |  | Treatment parameters [Electrical power/$CO_2$ content] | |
| --- | --- | --- | --- |
| Specimen | Average values [N/cm] | Layer A | Layer B |
| 1 | 15.0 | 2500 W/0% | 2500 W/1% |
| 2 | 15.1 | 2500 W/0% | 2500 W/2% |
| 3 | 14.4 | 2500 W/1% | 2500 W/0% |
| 4 | 14.6 | 2500 W/0% | 1000 W/0% |
| 5 | 14.7 | 2500 W/0% | 1000 W/1% |
| 6 | 15.3 | 2500 W/0% | 1000 W/2% |
| 7 | 3.5 | 1000 W/0% | |
| 8 | 6.2 | 1000 W/1% | |
| 9 | 7.6 | 2500 W/0% | |
| 10 | 10.5 | 2500 W/1% | |

FIG. 2 shows significantly higher anchoring forces (left-hand axis, in N/cm) on different double-sided treatment versus single-sided treatment.

The results of a different double-sided treatment versus a single-sided treatment show an increase in the anchoring force of more than 200%.

Example 2b

Verification of a Higher Anchoring Force for Suitably Set Double-Sided and Different Treatment Versus Double-Sided Identical Treatment Experimental Parameters 2

|  |  | Treatment parameters [Electrical power/$CO_2$ content] | |
| --- | --- | --- | --- |
| Specimen | Average values [N/cm] | Layer A | Layer B |
| 1 | 14.4 | 2500 W/0% | 2500 W/0% |
| 2 | 15.3 | 2500 W/0% | 1000 W/2% |
| 3 | 10.5 | 2500 W/1% | — |

Figure 3:
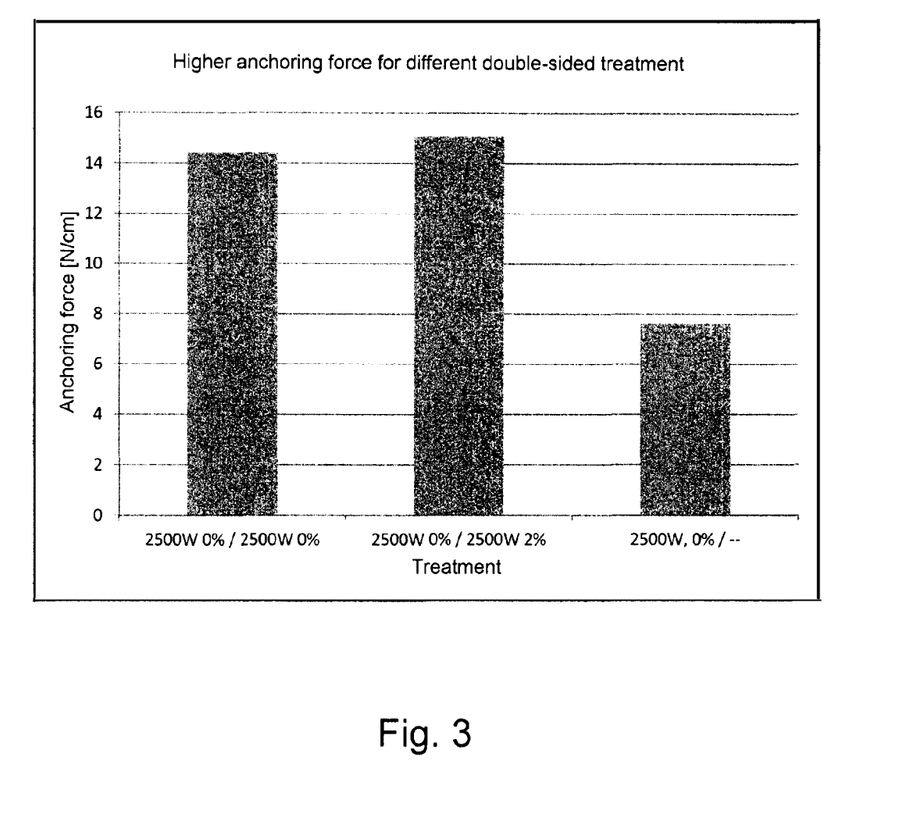
FIG. 3 illustrates the higher anchoring forces for different double-sided treatment versus identical double sided treatment The tables below and FIG. 1 give an overview of selected results.

FIG. 3 shows the higher anchoring forces for different double-sided treatment versus identical double-sided treatment.

Example 3

Equal or Higher Anchoring Force for Double-Sidedly Different Treatment with Higher Dose (or Electrical Power) Versus Double-Sidedly Different Treatment with Low-Set Dose (or Electrical Power)

|  |  | Treatment parameters [Electrical power/$CO_2$ content] | |
| --- | --- | --- | --- |
| Specimen | Average values [N/cm] | Layer A | Layer B |
| 2 | 15.1 | 2500 W/0% | 2500 W/2% |
| 6 | 15.3 | 2500 W/0% | 1000 W/2% |

From the table above it is apparent that the anchoring force in the case of treatments of the layers with a low electrical power or dose achieves the same or higher level as a treatment combination with high settings.

Within the treatment process this allows a saving of energy, but with an equivalent anchoring force.

Example 4

Higher Anchoring Force by Combination of Air Corona and N2 Corona on Opposite Interfaces In the case of lamination of two layers using a corona treatment on both surfaces in particular it is also possible to achieve an increased integral strength if a corona with air as process gas is used on one surface, and a corona with N2 as process gas is used on the other surface.

The treatment in examples 4a and 4b took place in web form with a DBD electrode configuration (Vetaphone). The differentiated treatment of the layers A and B increases the maximum force achieved.

Example 4a

Increase in the Anchoring Force Between VP and AP

A particular increase in the anchoring force between layers VP and AP was generated by means of the process taught. Measurement took place by the T-peel test method, after three days of storage at 23° C. The maximum force in the T-peel test was increased by more than 180% if the treatment atmosphere for the treatment of the respective layers was differentiated.

| Treatment parameters | | | | Release force [N/cm] |
| --- | --- | --- | --- | --- |
| VP | | PA | | |
| Dose | Process gas | Dose | Process gas | 3 d RT |
| 33 | N2 | — | — | 10.7 |
| 33 | N2 | 33 | N2 | 8.1 |
| 33 | N2 | 33 | Air | 14.8 |

Example 4b

Increasing the Anchoring Force Between a PE Foam and AP

In this example it can be seen that the specific combination of air corona and N2 corona on the interfaces to be laminated to one another can bring an advantage in the case of lamination to a PE-based foam (from Sekisui Alveo, 400 μm, closed-cell). The advantage is clearly manifested especially after accelerated aging at 40° C.

| Treatment parameters | | | | Anchoring force in [N/cm], after storage mode | |
|---|---|---|---|---|---|
| Carrier foam | | Adhesive PA | | | |
| Dose | Process gas | Dose | Process gas | 7 d RT | 7 d 40° |
| 100 | Air | — | — | 2.5 | 2.9 |
| 100 | Air | 50 | Air | 4.7 | 5.7 |
| 100 | Air | 50 | N2 | 4.8 | 7.0 |

The results demonstrated by way of example here can be understood on the basis of the comprehensively described acid-base interactions.

Integrated Material System Examples

Below, the invention is to be described in more detail, with reference to a number of examples, for integrated material systems, without wishing thereby to restrict the invention unnecessarily.

| Layer A | Layer B |
|---|---|
| open-cell and closed-cell foam carriers, especially of polyethylene and polypropylene | acrylate adhesive |
| heat-activatable tackifying resin layer | viscoelastic carrier |
| low-melting polyolefin carrier | heat-activatable tackifying resin layer |
| viscoelastic carrier | viscoelastic carrier |
| viscoelastic carrier | pressure-sensitive adhesive |
| viscoelastic carrier | pressure-sensitive adhesive with a viscoelastic carrier |
| fabric carrier | synthetic rubber adhesive[1] |
| nonwoven carrier | hotmelt acrylate adhesive[1] |
| polypropylene film carrier | dispersion acrylate adhesive[1] |
| satinized or creped paper carrier | dispersion acrylate adhesive[1] |
| injection molded parts of PE and PP, especially of PA | straight acrylate adhesive[1] |
| steel | pressure-sensitive acrylate adhesive |

[1]PSAs joined with a further carrier material or on a release liner

It is also possible to employ materials which have themselves already obtained a physical surface modification by a process.

The invention claimed is:

1. An adhesive tape, comprising at least two layers A and B laminated directly to one another, at least one or both layers A or B being an adhesive, layer B being in the form of a foam, and the interfaces of the layers A and B that are laminated to one another being subjected to a physical method, the physical method being selected from the group consisting of corona discharge, dielectric barrier discharge, flame pretreatment and plasma treatment, before the layers are laminated to one another, and the treatment applied to one of said at least two layers differing from the treatment applied to the other.

2. The adhesive tape as claimed in claim 1, wherein the interfaces laminated to one another possess an acid-base interaction or donor-acceptor interaction having been intensified or generated by the different types of physical treatments of the interfaces, one of which has been treated with an acidically modifying gas and the other having been treated with a basically modifying gas.

3. The adhesive tape as claimed in claim 1, wherein the first physical treatment is a corona treatment in air and the second physical treatment is a corona treatment in $N_2$, the $O_2$ content of the $N_2$ atmosphere being <1000 ppm.

4. The adhesive tape as claimed in claim 1, wherein at least one of the layers A or B is viscoelastic.

5. The adhesive tape as claimed in claim 1, wherein the adhesive is a pressure-sensitive adhesive.

6. The adhesive tape as claimed in claim 1, wherein the layer B is an adhesive bonding component.

7. The adhesive tape as claimed in claim 1, wherein the physical methods differed with respect to the dose which was applied to each of the interfaces.

8. The adhesive tape as claimed in claim 1, wherein the treatment time for the interfaces of the layers A and B is different.

9. The adhesive tape as claimed in claim 1, wherein the physical methods differed with respect to the process selected.

10. The adhesive tape as claimed in claim 1, wherein in the case of the physical methods the following pure, or mixtures of, process gases form a treatment atmosphere: $N_2$, $O_2$, $H_2$, $CO_2$, Ar, He, ammonia, ethylene, optionally with steam or other volatile constituents being added.

11. The adhesive tape of claim 1 consisting of said two layers A and B laminated directly to one another.

* * * * *